United States Patent
Chu et al.

(10) Patent No.: US 8,938,771 B2
(45) Date of Patent: **\*Jan. 20, 2015**

(54) NETWORK RECEIVER AND CONTROL METHOD THEREOF

(75) Inventors: Yuan-Jih Chu, Hsinchu (TW);
Liang-Wei Huang, Hsinchu (TW);
Ching-Yao Su, Taichung (TW);
Ming-Feng Hsu, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 189 days.

This patent is subject to a terminal disclaimer.

(21) Appl. No.: 13/485,948

(22) Filed: Jun. 1, 2012

(65) Prior Publication Data

US 2012/0317608 A1    Dec. 13, 2012

(30) Foreign Application Priority Data

Jun. 7, 2011    (TW) .............................. 100119758 A

(51) Int. Cl.
*H04N 7/173*    (2011.01)
*H04L 25/02*    (2006.01)
*H04N 21/4363*    (2011.01)

(52) U.S. Cl.
CPC ........ *H04L 25/0278* (2013.01); *H04L 25/0272* (2013.01); *H04N 21/43635* (2013.01)
USPC ........................................................ 725/131

(58) Field of Classification Search
CPC . H04N 21/43635; H04N 5/44; H04L 25/0278
USPC .................... 725/131; 375/219, 227
See application file for complete search history.

(56) References Cited

U.S. PATENT DOCUMENTS

| | | | | |
|---|---|---|---|---|
| 6,654,958 | B1 * | 11/2003 | Roberts et al. ................. | 725/129 |
| 6,744,275 | B2 | 6/2004 | Chansungsan | |
| 2009/0257522 | A1 * | 10/2009 | Kuwano ......................... | 375/267 |
| 2010/0150213 | A1 * | 6/2010 | Huang et al. ................... | 375/219 |
| 2010/0253856 | A1 * | 10/2010 | Sato et al. ...................... | 348/723 |
| 2012/0002562 | A1 * | 1/2012 | Kawade ......................... | 370/252 |
| 2013/0033329 | A1 * | 2/2013 | Zhu et al. ....................... | 331/15 |

FOREIGN PATENT DOCUMENTS

| | | |
|---|---|---|
| CN | 1625875 A | 6/2005 |
| CN | 101998075 A | 3/2011 |
| EP | 2 306 658 A1 | 4/2011 |
| TW | 201114198 | 4/2011 |

\* cited by examiner

*Primary Examiner* — Benjamin R Bruckart
*Assistant Examiner* — Aklil Tesfaye
(74) *Attorney, Agent, or Firm* — Winston Hsu; Scott Margo

(57) ABSTRACT

A network receiver includes a first variable resistor, a second variable resistor, a first processing unit, a second processing unit and an adjusting circuit. The first variable resistor is coupled to a first transmission line via a first terminal for transmitting a first signal. The second variable resistor is coupled to a second transmission line via a second terminal for transmitting a second signal. The first processing unit is utilized for obtaining a difference according to the first signal and the second signal, and processing the difference to generate first data. The second processing unit is utilized for obtaining a summation according to the first signal and the second signal, and processing the summation to generate second data. The adjusting circuit is utilized for adjusting resistance(s) of at least one of the first variable resistor and the second variable resistor according to the first data and the second data.

12 Claims, 4 Drawing Sheets

NETWORK RECEIVER AND CONTROL METHOD THEREOF

BACKGROUND OF THE INVENTION

1. Field of the Invention

The present invention relates to a network receiver, and more particularly, to a network receiver complied with high definition multimedia interface (HDMI) version 1.4 and the control method thereof.

2. Description of the Prior Art

The HDMI version 1.4 has a new function named HDMI Ethernet and Audio return Channel (HEAC), where the HEAC function can make a network receiver to transmit/receive HDMI Ethernet Channel (HEC) data and Audio Return Channel (ARC) data simultaneously. Therefore, complex home network wiring can be simplified to provide a single high bandwidth and high-quality wiring in order to transfer complete images, audio, and Ethernet transports, and achieve integration of multimedia networking applications.

In the HDMI device having HEAC function, both the HEC data and the ARC data are transmitted via two transmission lines, where the transmitted HEC data is a differential mode signal, and the transmitted ARC data is a common mode signal. Ideally, an impedance of each of the two transmission lines should be 50 ohm that is defined in HDMI specification, and the HEC data can be obtained by calculating a difference between two signals of the two transmission lines at receiving ends to cancel the common mode signal. However, referring to a common mode signal shown in FIG. 1, if the transmission lines (TX+, TX−) used to transmit HEC data and ARC data have poor quality, that is their impedances may not be the same or the impedances of the transmission lines do not match the impedances of the receiver, the amplitudes of two-halves of the received common mode signals may be different. The two-halves of the common mode signal having different amplitudes will result in a generation of an unwanted differential mode signal, and this unwanted differential mode signal will influence the quality of the HEC data.

SUMMARY OF THE INVENTION

It is therefore an objective of the present invention to provide a network receiver and control method thereof, which can keep the quality of the HEC data even when the qualities of the transmission lines are poor, to solve the above-mentioned problems.

According to one embodiment of the present invention, a network receiver comprises a first variable resistor, a second variable resistor, a first processing unit, a second processing unit and an adjusting circuit. The first variable resistor is coupled to a first transmission line via a first terminal, where the first transmission line is utilized for transmitting a first signal. The second variable resistor is coupled to a second transmission line via a second terminal, where the second transmission line is utilized for transmitting a second signal. The first processing unit is coupled to the first terminal and the second terminal, and is utilized for obtaining a difference according to the first signal and the second signal, and processing the difference to generate first data. The second processing unit is coupled to the first terminal and the second terminal, and is utilized for obtaining a summation according to the first signal and the second signal, and processing the summation to generate second data. The adjusting circuit is coupled to the first processing unit and the second processing unit, and is utilized for adjusting resistance(s) of at least one of the first variable resistor and the second variable resistor according to the first data and the second data.

According to another embodiment of the present invention, a control method of a network receiver is provided, where the network receiver comprises a first variable resistor and a second variable resistor, the first variable resistor is connected to a first transmission line via a first terminal, the second variable resistor is connected to a second transmission line via a second terminal. The method comprises: receiving a first signal at the first terminal and a second signal at the second terminal; obtaining a difference according to the first signal and the second signal, and processing the difference to generate first data; obtaining a summation according to the first signal and the second signal, and processing the summation to generate second data; and adjusting resistance(s) of at least one of the first variable resistor and the second variable resistor according to the first data and the second data.

In addition, the first data is HEC data, and the second data is ARC data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
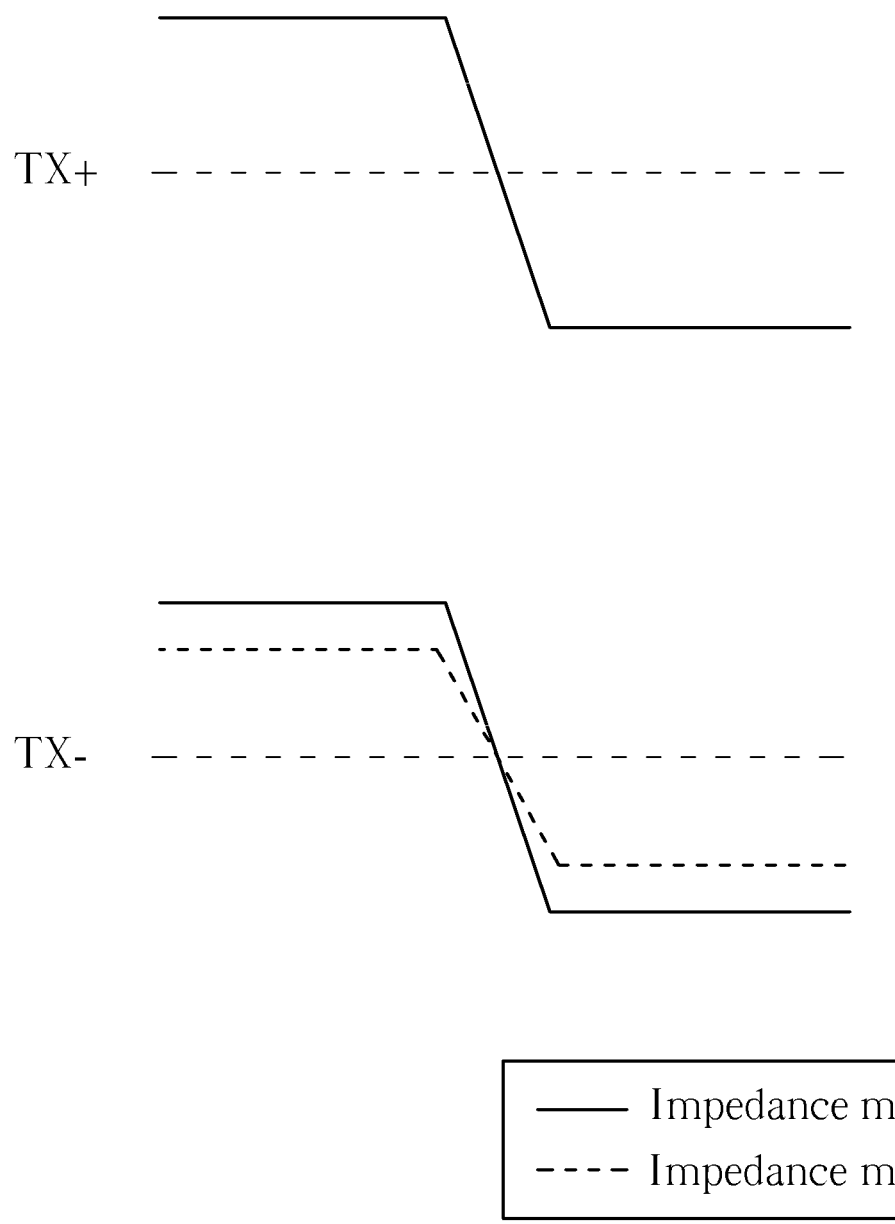
FIG. 1 shows a common mode signal carried on two transmission lines when impedances of the two transmission lines are mismatched.
Figure 2:
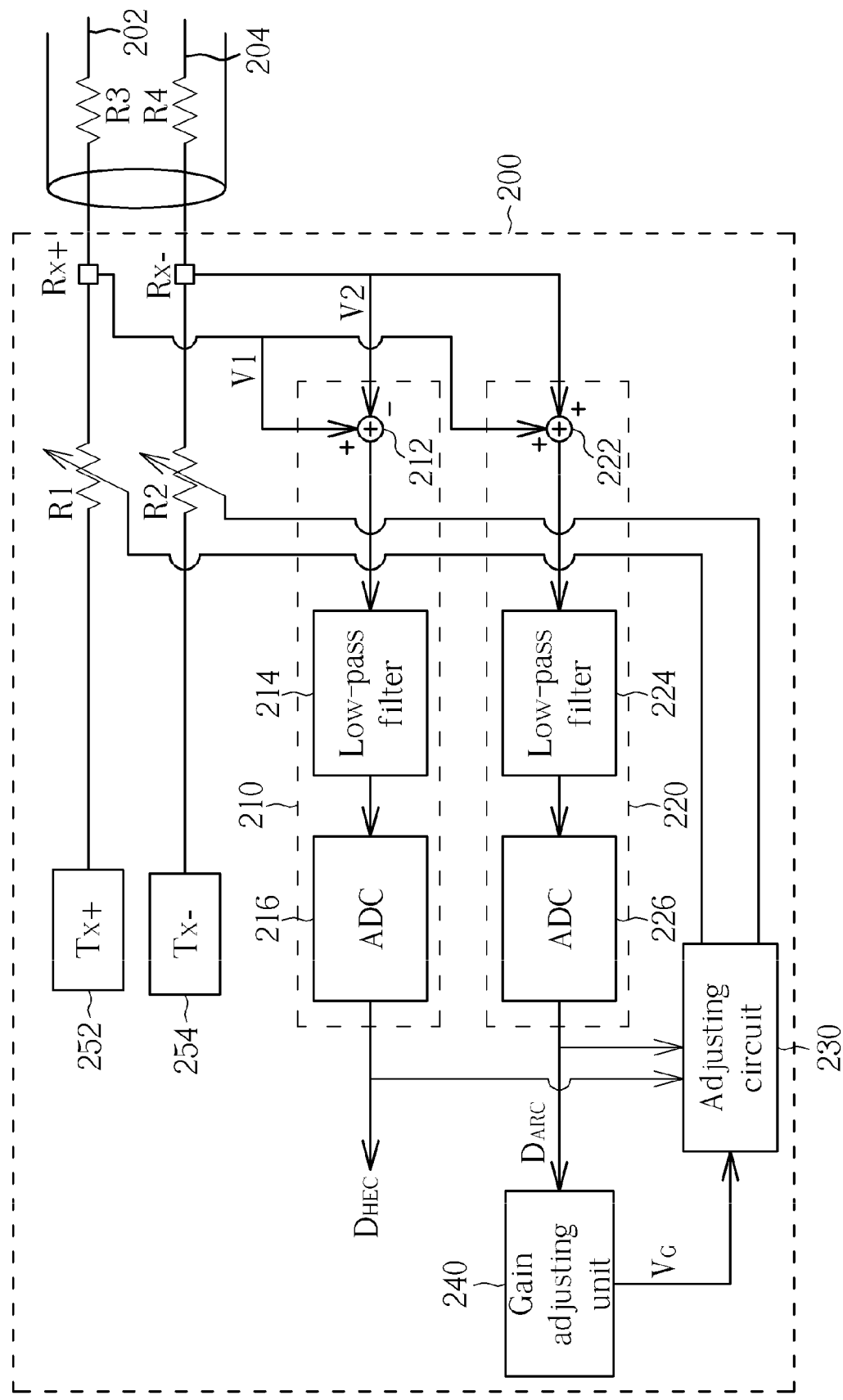
FIG. 2 is a diagram illustrating a network receiver according to one embodiment of the present invention.

Please refer to FIG. 2, which illustrates a network receiver 200 according to one embodiment of the present invention. As shown in FIG. 2, the network receiver 200 includes two variable resistors R1 and R2, two processing units 210 and 220, an adjusting circuit 230, a gain adjusting unit 240, two signal transmitting terminals Tx+ and Tx−, and two signal receiving terminals Rx+ and Rx−, where the processing unit 210 includes a subtractor 212, a low-pass filter 214 and an analog-to-digital converter (ADC) 216, and the processing unit 220 includes an adder 222, a low-pass filter 224 and an ADC 226. In addition, the variable resistors R1 and R2 are coupled to transmission lines 202 and 204 via the signal receiving terminals Rx+ and Rx−, respectively, where the impedances of the transmission lines 202 and 204 are represented as R3 and R4, respectively.

In this embodiment, the network receiver 200 is complied with HDMI version 1.4, and is capable of receiving/transmitting HEC data and ARC data, where the HEC data transmitted on the transmission lines 202 and 204 is a differential mode signal, and the ARC data transmitted on the transmission lines 202 and 204 is a common mode signal.

As shown in FIG. 2, the subtractor 212 receives a first signal V1 and a second signal V2 at the signal receiving terminals Rx+ and Rx−, respectively, and the subtractor 212 subtracts the second signal V2 from the first signal V1 to generate a difference. Then the low-pass filter 216 filters the difference, and the ADC 216 performs an analog-to-digital converting operation upon the filtered difference to generate the HEC data $D_{HEC}$. At the same time, the adder 222 of the processing unit 220 receives the first signal V1 and the second signal V2 at the signal receiving terminals Rx+ and Rx−, respectively, and the adder 222 adds the second signal V2 to the first signal V1 to generate a summation. Then the low-pass filter 226 filters the summation, and the ADC 226 performs an analog-to-digital converting operation upon the filtered summation to generate the ARC data $D_{ARC}$.

As described in the section "Description of the Prior Art", the resistance R3 and R4 of the transmission lines 202 and 204 may not equal to 50 ohm defined in the HDMI specification, therefore, the HEC data $D_{HEC}$ outputted from the processing unit 210 may be influenced by the common mode signal (i.e. ARC data) carried on the transmission lines 202 and 204. In this embodiment, the adjusting circuit 230 may adjust the resistance(s) of at least one of the variable resistors R1 and R2 according to the HEC data $D_{HEC}$ and the ARC data $D_{ARC}$ to make the impedances of the variable resistors R1 and R2 match the impedances R3 and R4. For example, if the impedances R3 and R4 of the transmission lines 202 and 204 are 50 ohm and 45 ohm, respectively, the adjusting circuit 230 can adjust the resistances of the variable resistors R1 and R2 to be 50 ohm and 45 ohm, respectively, or any other resistance combination that satisfies the following relationship: (R1/R3)=(R2/R4).

Figure 3:
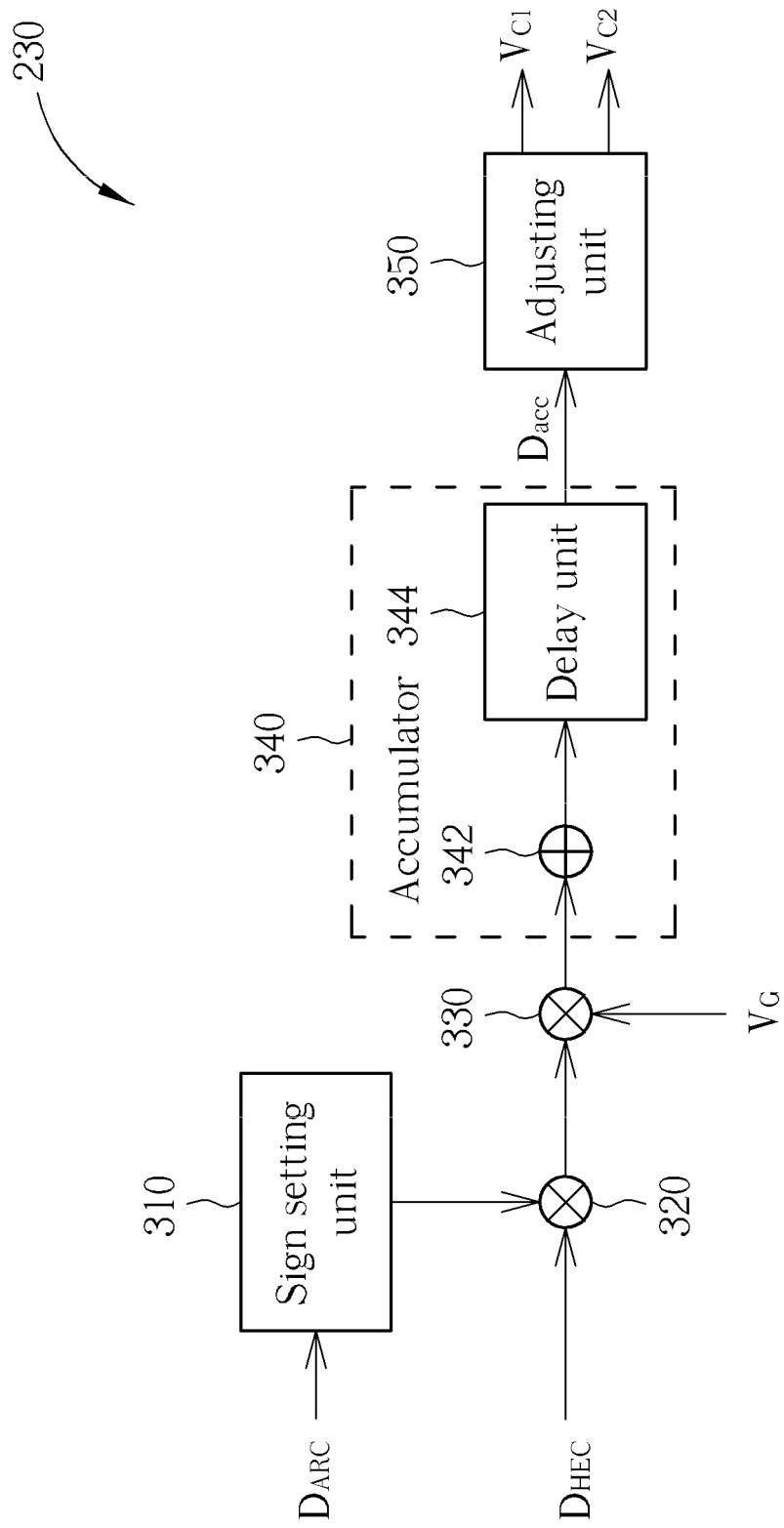
FIG. 3 is a diagram illustrating an adjusting circuit according to one embodiment of the present invention.

Please refer to FIG. 3, which illustrates the adjusting circuit 230 according to one embodiment of the present invention. As shown in FIG. 3, the adjusting circuit 230 is implemented by a correlator, and the adjusting circuit 230 includes a sign setting unit 310, two multipliers 320 and 330, an accumulator 340 and an adjusting unit 350, where the accumulator 340 includes an adder 342 and a delay unit 344.

In the operations of the adjusting circuit 230, the ARC data $D_{ARC}$ is processed by the sign setting unit 310 (i.e., when $D_{ARC}$ is logic "1", the sign setting unit 310 outputs "1"; and when $D_{ARC}$ is logic "0", the sign setting unit 310 outputs "−1"), and the processed ARC data is multiplied by the HEC data $D_{HEC}$ by the multiplier 320, and then multiplied by a gain $V_G$ by the multiplier 330, and then accumulated by the accumulator 340 to generate accumulation data $D_{acc}$. Finally, the adjusting unit 350 generates two control signals $V_{C1}$ and $V_{C2}$ according to the accumulation data $D_{acc}$ to adjust the resistance(s) of at least one of the variable resistors R1 and R2.

In detail, if the impedances of the variable resistors R1 and R2 match the impedances R3 and R4 of the transmission lines 202 and 204, there should be no correlation between the HEC data $D_{HEC}$ and the ARC data $D_{ARC}$. That is, the accumulation data $D_{acc}$ should be zero (or much closer to zero). On the other hand, if the impedances of the variable resistors R1 and R2 do not match the impedances R3 and R4 of the transmission lines 202 and 204, the correlation between the HEC data $D_{HEC}$ and the ARC data $D_{ARC}$ is existed, and the accumulation data $D_{acc}$ will not be zero. Therefore, the adjusting unit 350 may adjust the resistance(s) of at least one of the variable resistors R1 and R2 according to the accumulation data $D_{acc}$ to make the impedances of the variable resistors R1 and R2 match the impedances R3 and R4 of the transmission lines 202 and 204.

In addition, in the transmission line theory, the impedances R3 and R4 of the transmission lines 202 and 204 depend on a frequency of the audio data carried thereon. Therefore, the gain adjusting unit 240 can determine the gain $V_G$ shown in FIG. 3 by referring to a degree of a frequency variation of the ARC data $D_{ARC}$ so as to make the adjusting circuit 230 use the most appropriate speed to adjust the resistances of the resistors R1 and R2. In detail, when the frequency variation of the ARC data $D_{ARC}$ is great or the frequency variation speed of the ARC data $D_{ARC}$ is fast, the gain adjusting unit 240 outputs a greater gain $V_G$ to make the resistances of the resistors R1 and R2 be adjusted quickly in response to the frequency of the current ARC data $D_{ARC}$. On the other hand, when the frequency variation of the ARC data $D_{ARC}$ is small or the frequency variation speed of the ARC data $D_{ARC}$ is low, the gain adjusting unit 240 outputs a smaller gain $V_G$ to stabilize selections of the resistances of the resistors R1 and R2.

In light of above, the network receiver 200 can adjust the resistances of the resistors R1 and R2 to make the impedances of the resistors R1 and R2 match the impedances R3 and R4 of the transmission lines 202 and 204. Therefore, the HEC data $D_{HEC}$ may not be influenced by the common mode signal (i.e. ARC data). In addition, because of the impedance matching, amplitudes of the signals outputted from the signal transmitting terminals Tx+ and Tx− to the transmission lines 202 and 204 will be symmetrical to each other to satisfy the HDMI specification.

In another embodiment, the multiplier 330 can be removed from the adjusting circuit 230, and the gain adjusting unit 240 can also be removed from the network receiver 200. This alternative design should fall within the scope of the present invention.

In addition, in the above-mentioned embodiments, the network receiver 200 is complied with HDMI version 1.4, and is used to receive/transmit HEC data and ARC data. However, it is not meant to be a limitation of the present invention. In other embodiments of the present invention, the network receiver can receive first data and a second data that are complied with any other standard, where the first data is transmitted by using a differential mode signal and the second data is transmitted by using a common mode signal.

Figure 4:
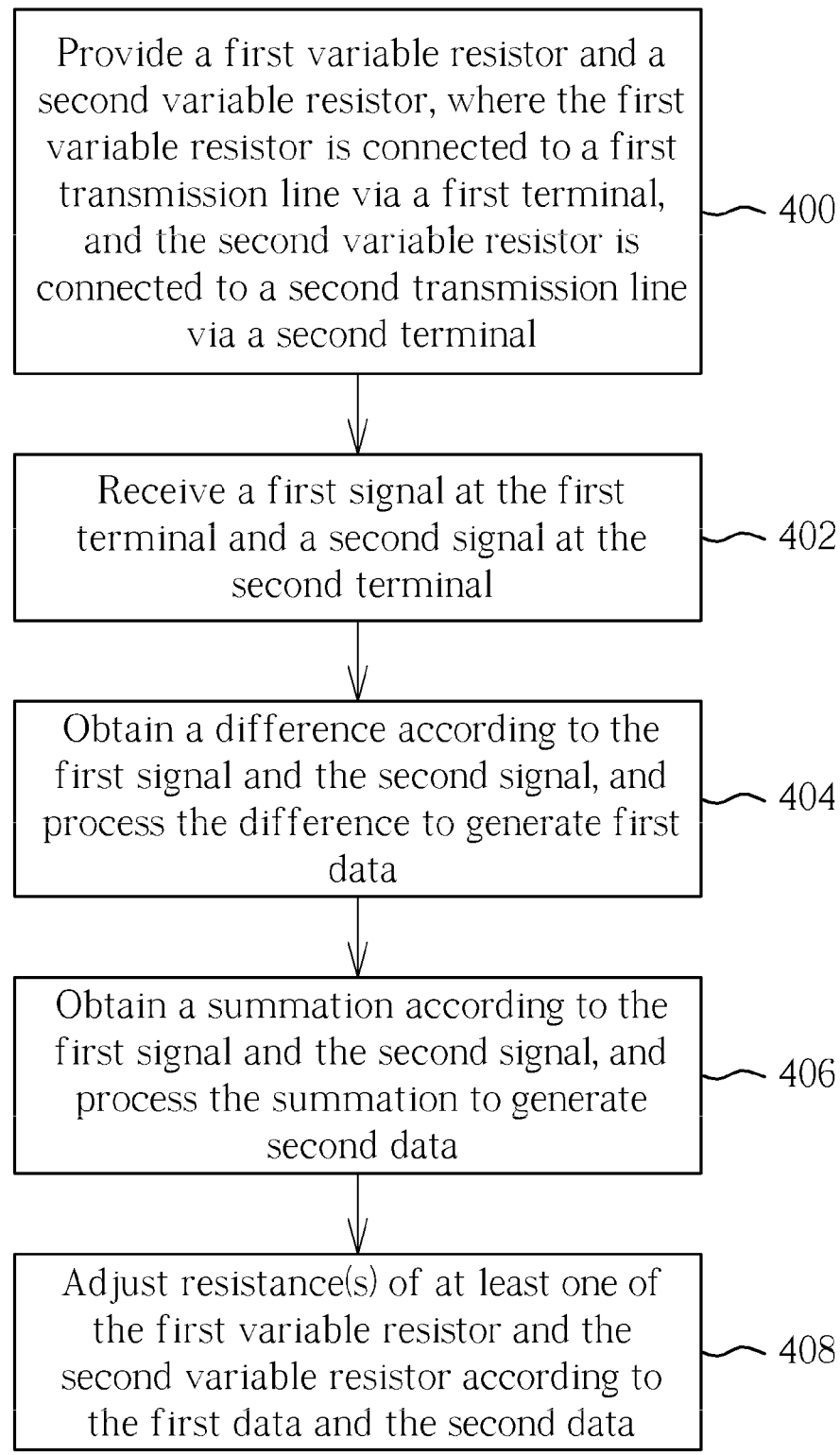
FIG. 4 is a flowchart of a control method of a network receiver according to one embodiment of the present invention.

Please refer to FIG. 4, which is a flowchart of a control method of a network receiver according to one embodiment of the present invention. Referring to FIG. 2 and FIG. 4, the flow is described as follows.

Step 400: provide a first variable resistor and a second variable resistor, where the first variable resistor is connected to a first transmission line via a first terminal, and the second variable resistor is connected to a second transmission line via a second terminal.

Step 402: receive a first signal at the first terminal and a second signal at the second terminal.

Step 404: obtain a difference according to the first signal and the second signal, and process the difference to generate first data.

Step 406: obtain a summation according to the first signal and the second signal, and process the summation to generate second data.

Step 408: adjust resistance(s) of at least one of the first variable resistor and the second variable resistor according to the first data and the second data.

In addition, the first transmission line and the second transmission line are used to transmit/receive HEC data and ARC data.

Briefly summarized, in the network receiver and control method thereof of the present invention, two variable resistors are connected to two transmission lines, respectively, and the resistances of the two variable resistors can be adjusted according to the received network data (i.e. HEC data) and audio data (i.e. ARC data) to make the adjusted resistances of the two variable resistors match the impedances of the two transmission lines. Therefore, quality of the network data can be improved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A network receiver, comprising: a first variable resistor, coupled to a first transmission line via a first terminal, wherein the first transmission line is utilized for transmitting a first signal; a second variable resistor, coupled to a second transmission line via a second terminal, wherein the second transmission line is utilized for transmitting a second signal; a first processing circuit, coupled to the first terminal and the second terminal, for obtaining a difference according to the first signal and the second signal, and processing the difference to generate first data; a second processing circuit, coupled to the first terminal and the second terminal, for obtaining a summation according to the first signal and the second signal, and processing the summation to generate second data; and an adjusting circuit, coupled to the first processing circuit and the second processing circuit, for adjusting resistance(s) of at least one of the first variable resistor and the second variable resistor according to the first data and the second data, wherein the adjusting circuit adjusts the resistance(s) of at least one of the first variable resistor and the second variable resistor by referring to a correlation between the first data and the second data.

2. The network receiver of claim 1, wherein the network receiver is complied with high definition multimedia interface (HOMI) standard, the first data is HDMI Ethernet Channel (HEC) data, and the second data is Audio Return Channel (ARC) data.

3. The network receiver of claim 1, wherein the adjusting circuit comprises: a multiplier, for multiplying the first data by the second data to generate third data; an accumulator, coupled to the multiplier, for accumulating the third data outputted from the multiplier to generate accumulation data; and an adjusting unit circuit, coupled to the accumulator, for adjusting the resistance(s) of at least one of the first variable resistor and the second variable resistor according to the accumulation data.

4. The network receiver of claim 1, wherein the adjusting circuit comprises: a first multiplier, for multiplying the first data by the second data to generate third data; a second multiplier, for multiplying the third data by a gain to generate fourth data; an accumulator, coupled to the second multiplier, for accumulating the fourth data outputted from the second multiplier to generate accumulation data; and an adjusting unit circuit, coupled to the accumulator, for adjusting the resistance(s) of at least one of the first variable resistor and the second variable resistor according to the accumulation data.

5. The network receiver of claim 4, further comprising: a gain adjusting circuit, coupled to the second processing circuit and the second multiplier, for receiving the second data, and determining the gain according to the second data.

6. The network receiver of claim 5, wherein the gain adjusting circuit determines the gain according to a frequency variation of the second data.

7. A control method of a network receiver, wherein the network receiver comprises a first variable resistor and a second variable resistor, the first variable resistor is connected to a first transmission line via a first terminal, the second variable resistor is connected to a second transmission line via a second terminal, and the method comprises: receiving a first signal at the first terminal and a second signal at the second terminal; obtaining a difference according to the first signal and the second signal, and processing the difference to generate first data; obtaining a summation according to the first signal and the second signal, and processing the summation to generate second data; and adjusting resistance(s) of at least one of the first variable resistor and the second variable resistor according to the first data and the second data, comprising: adjusting the resistance(s) of at least one of the first variable resistor and the second variable resistor by referring to a correlation between the first data and the second data.

8. The method of claim 7, wherein the network receiver is complied with high definition multimedia interface (HDMT) standard, the first data is HDMI Ethernet Channel (HEC) data, and the second data is Audio Return Channel (ARC) data.

9. The method of claim 7, wherein the step of adjusting the resistance(s) of at least one of the first variable resistor and the second variable resistor comprises: providing a multiplier to multiply the first data by the second data to generate third data; accumulating the third data outputted from the multiplier to generate accumulation data; and adjusting the resistance(s) of at least one of the first variable resistor and the second variable resistor according to the accumulation data.

10. The method of claim 7, wherein the adjusting circuit comprises: multiplying the first data by the second data to generate third data; providing a multiplier to multiply the third data by a gain to generate fourth data; accumulating the fourth data outputted from the multiplier to generate accumulation data; and adjusting the resistance(s) of at least one of the first variable resistor and the second variable resistor according to the accumulation data.

11. The method of claim 10, further comprising: determining the gain according to the second data.

12. The method of claim 11, wherein the step of determining the gain according to the second data comprises: determining the gain according to a frequency variation of the second data.

* * * * *